Figure 3:
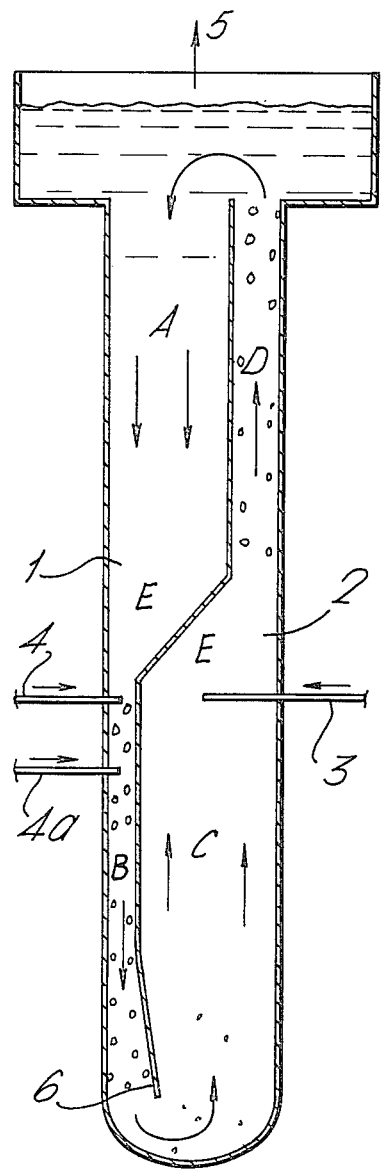

United States Patent [19]

Roesler, deceased

[11] 4,230,563
[45] Oct. 28, 1980

[54] TREATMENT OF BIOLOGICALLY-DEGRADABLE WASTE

[75] Inventor: Frank C. Roesler, deceased, late of Stockton-on-Tees, England, by Johanna Roesler, executrix

[73] Assignee: Imperial Chemical Industries Limited, London, United Kingdom

[21] Appl. No.: 956,923

[22] Filed: Oct. 31, 1978

Related U.S. Application Data

[63] Continuation of Ser. No. 794,403, May 6, 1977, abandoned.

[30] Foreign Application Priority Data

May 14, 1976 [GB] United Kingdom ............... 19980/76

[51] Int. Cl.² .............................................. C02C 1/02
[52] U.S. Cl. .................................................... 210/629
[58] Field of Search ......................... 210/2-9, 210/14, 15, 17, 63 R, 150, 194, 199, 205, 221 P; 261/77, 123

[56] References Cited

U.S. PATENT DOCUMENTS

| | | | |
|---|---|---|---|
| 1,963,354 | 6/1934 | Currie | 210/63 R |
| 3,642,615 | 2/1972 | Wieferig | 210/14 |
| 3,980,556 | 9/1976 | Besik | 210/6 |
| 4,008,159 | 2/1977 | Besik | 210/7 |
| 4,045,344 | 8/1977 | Yokota | 210/151 |

FOREIGN PATENT DOCUMENTS 1417486 12/1975 United Kingdom .
1473665  5/1977 United Kingdom ...................... 210/14

OTHER PUBLICATIONS

*The Condensed Chemical Dictionary*, 8th Ed., 1971, p. 382.

Primary Examiner—Thomas G. Wyse
Assistant Examiner—Peter A. Hruskoci
Attorney, Agent, or Firm—Cushman, Darby & Cushman

[57] ABSTRACT

Method for treating sewage, wherein sewage is circulated around a system comprising a downcomer and a riser communicating with each other at their upper and lower ends, the downcomer having an upper portion of enlarged cross-section and the riser having a lower portion of enlarged cross-section.

1 Claim, 6 Drawing Figures

Fig.1.
Fig.2.
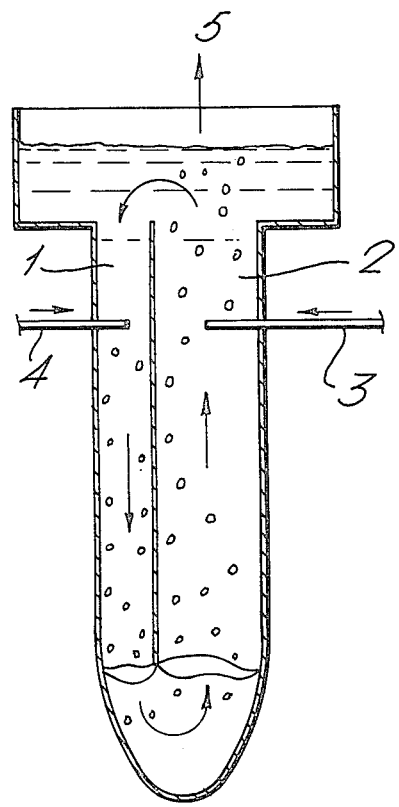
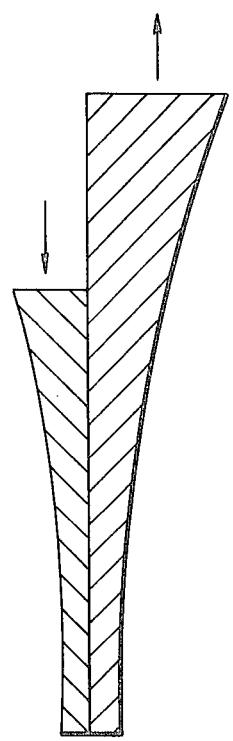

TREATMENT OF BIOLOGICALLY-DEGRADABLE WASTE

This is a continuation, of application Ser. No. 794,403 filed May 6, 1977, now abandoned.

The present invention relates to solids-liquid separation and, in particular, to a method for the treatment of liquid carrying biologically-degradable material, hereinafter referred to as "sewage", which term is to be understood to include all types of biologically-degradable domestic and industrial waste materials, for example normal domestic waste, the effluents produced by farms, food factories, and other industries producing such waste.

The methods generally employed in the treatment of sewage comprise essentially a primary treatment by physical methods such as screening and sedimentation to remove large and heavy suspended solids, followed by a secondary treatment by biological methods to remove organic materials. The present invention relates to the secondary treatment stage.

In our accepted British patent application No. 1,473,665 (U.S. application of Bailey et al, Ser. No. 822,224, filed Feb. 28, 1978) we have described and claimed a method for the treatment of sewage which comprises a step wherein the sewage is circulated around a system comprising a downcomer and a riser communicating with each other at their upper and lower ends, an oxygen-containing gas (e.g air) being supplied to the sewage as it passes through the downcomer. The said accepted Application also describes and claims an apparatus for circulating a liquid, comprising a downcomer and a riser communicating with each other at upper and lower ends, means for circulating liquid around the system and means for supplying an oxygen-containing gas (e.g air) to liquid in the downcomer.

Purely by way of explanatory introduction to the present invention, one example of the system of the said accepted Application is illustrated in FIGS. 1 and 2 of the accompanying drawings. The system includes a shaft (sunk into the ground, or built above ground as a pressure vessel) containing a downcomer 1 and a riser 2 each of which has a constant cross-section; the ratio of the total effective cross-sectional area of the riser to that of the downcomer is within the range 1:1 to 2:1. Air is injected into the riser at 3 for start-up of the circulation of the liquid through the system, and further air is injected into the downcomer at 4 as an oxygen supply. Air escapes at 5. Once the sewage is circulating steadily around the system, its velocity in the downcomer is about 1.2 to 2.0 meters/sec. and its velocity in the riser is about 0.5 to 1.5 meters/sec. The resulting voidage distribution is illustrated in FIG. 2. (The voidage is the fraction of the volume of the circulating two-phase fluid which is occupied by bubbles). The difference in voidage between the riser and the downcomer provides the drive for circulating the sewage around the system.

The total quantity of air injected into the shaft is determined by the oxygen requirements. In a shaft for high-intensity treatment (e.g for the treatment of industrial effluent with heavy BOD) one needs to inject a lot of air, in which case there is no problem with the drive. On the other hand, when treating an effluent with light BOD (such as domestic sewage) one needs less air insofar as the oxygen supply is concerned. In this latter case, the voidage in both the downcomer and the riser will be small; their difference will be even smaller, but it must be sufficient to overcome the frictional resistance to the circulation of the sewage around the system. The problem of drive at low-intensity treatment is particularly marked for relatively shallow shafts (e.g of the order of 40 to 70 meters) since for any given treatment-intensity, the air injection-rate per unit shaft cross-sectional area is approximately proportional to the depth of the shaft.

To solve this problem, a novel "spout drive" has been designed with reduced liquid circulation and with a riser and a downcomer, each of which is of varying cross-section. The liquid circulation is chosen so that at the top of the riser the voidage (which is dependent upon the rate of the sir injection, which is known) is between 0.1 and 0.2, preferably about 0.15. (Values higher than 0.2 could lead to the dynamically wasteful coalescing of small bubbles into large ones—sometimes referred to as "slugging"). The cross-sectional area of the upper part of the riser is chosen so that the liquid velocity in this section is not less than 1 meter/sec., preferably in the range 1.2 to 1.5 meters/sec. The cross-sectional area of the lower part of the downcomer is chosen so that the liquid velocity in this section is not less than 1.2 meters/sec., preferably in the range 1.3 to 2.0 meters/sec. (These high velocities are necessary for high efficiency in carrying the injected air through the downcomer).

The novel "spout drive" design of the present invention is illustrated schematically in FIG. 3. As in our above-mentioned accepted British patent application No. 1,473,665 it comprises a shaft comprising a downcomer 1 and a riser 2, with means for injecting start-up air into the riser at 3 and means for injecting air into the downcomer as an oxygen supply at 4. Unlike our previous proposals, however, neither the riser nor the downcomer is of constant cross-sectional area. On the contrary, the upper part (Section A) of the downcomer 1 is of relatively large cross-sectional area compared with the lower part (Section B) of the downcomer which is of relatively small cross-sectional area. Section A is connected to Section B by a connecting portion E which is of lesser length than either A or B. Section C is connected to Section D by a connecting portion E which is of lesser length than either C or D. In the riser the reverse is the case; the lower part (Section C) of the riser 2 is of relatively large cross-sectional area and the upper part (Section D) of the riser is of relatively small cross-sectional area. In sections A and C, the liquid velocities will be low, but no particular values are prescribed therefor; they will be determined by how much of the total cross-sectional area of the shaft is left after provision has been made for Sections D and B respectively. In practice, the velocity in Section C (for example) could be as low as 0.05 meters/second. Air-injection into the downcomer is carried out in the narrow Section B, usually (but not necessarily) close to the top of the narrow Section B, for example at 4 and/or 4a.

The present invention accordingly provides a method for the treatment of a solids-liquid sewage mixture which comprises a step wherein the solids-liquid sewage mixture is circulated around a system comprising a downcomer and a riser communicating with each other at their upper and lower ends, the downcomer having an upper portion of enlarged cross-sectional area and a lower portion of reduced cross-sectional area, the riser having a lower portion of enlarged cross-sectional area and an upper portion of reduced cross-sectional area, air being supplied to the riser to start the solids-liquid sewage mixture circulating around the system and an oxygen-containing gas being supplied to the sewage as it passes through the lower portion of the downcomer. The oxygen-containing gas is preferably air.

Preferably, at or near the bottom end of the Section B of the downcomer, its cross-sectional area is gradually increased or widened so that the lowermost portion 6 of the downcomer 1 acts as a diffuser for the recovery of kinetic energy. However, the final velocity of the sewage as it leaves the bottom end of the downcomer is preferably still at least 0.6 meters/second so that bubbles cannot slip back up the downcomer.

With their reduced cross-sectional area and the reduced liquid circulation therein, Sections B and D can now produce a useful voidage difference and an efficient drive.

Purely by way of example, the depth of Section D may typically be in the range 15 to 35 meters, which two values correspond, approximately, to total shaft depths of 40 meters and 100 meters respectively. However, the depth of Section D will also depend on the friction characteristics of the shaft, and will be greater for narrow shafts.

Figure 4:
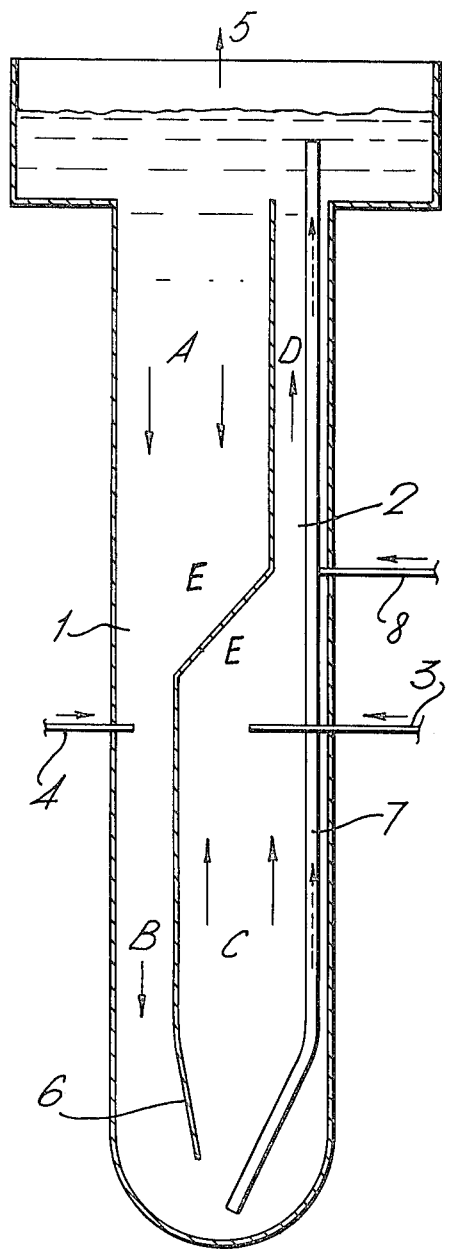

In the cases where the velocity in Section C turns out to be so low that sedimentation of solids becomes a problem, a special purge line of pipe 7 may be provided as shown in FIG. 4.

The purge line is in the form of a pipe extending from, or from near, the bottom of the shaft, through the Section C and into, and preferably through, the Section D. Air is injected into the purge line, 7, for example at 8, intermittently of continuously, at a rate sufficient to ensure that the liquid velocity is sufficient (e.g at least 0.5 meters/second) to carry solids, such as sand or small grit, readily up the purge line. The purge line could plausibly be a pipe of small diameter (e.g of the order of 0.10 or 0.15 meters) so that the air requirement for the purge line is small.

The low liquid velocity in Section C provides an advantage insofar as oxygen absorption is concerned, since it prolongs the residence time of bubbles in the lower, high-pressure, region of the shaft.

Each new shaft incorporating the novel "spout drive" of the present invention would be individually designed for its particular treatment duty. The smaller the required rate of oxygen transfer, the less air will be needed and, consequently, the smaller will become the cross-sectional areas of Sections B and D. On the other hand, for higher treatment intensity, the cross-sectional areas of these sections will have to be increased until, eventually, the design reverts to that shown in FIG. 1.

Figure 5A:
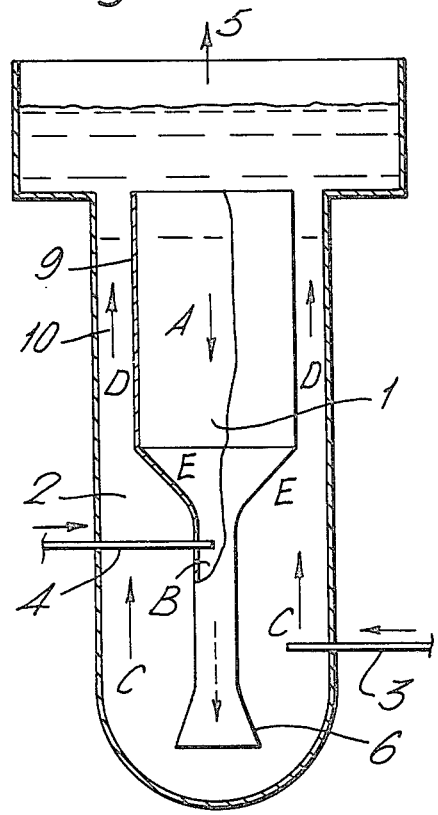
Figure 5B:
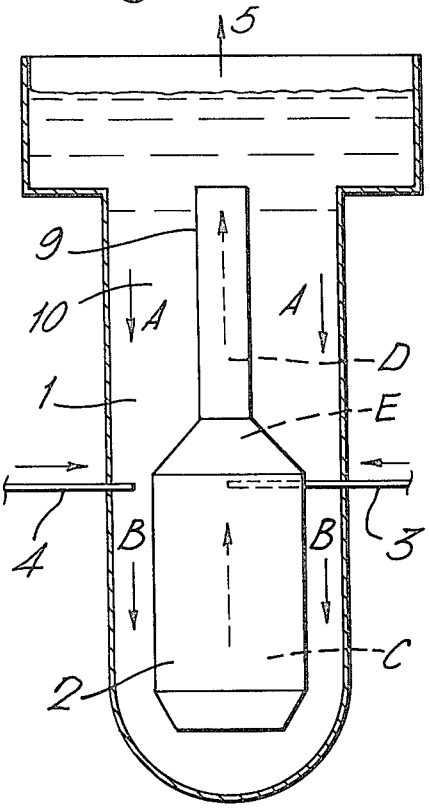

The provision of the four Sections A to D can be obtained by several variations in the construction of the shaft. It is only in large shafts (e.g 2 meters diameter or greater) that a partitioning wall between the downcomer and the riser is the likely choice. For shafts of smaller diameter, it is more likely that the downcomer and riser will be formed by a tube 9 suspended inside the shaft, and separated therefrom by an annulus 10, as shown in FIGS. 5A and 5B. In FIG. 5A the downcomer is the interior of the tube 9 and the riser is the annulus 10, whereas in FIG. 5B the reverse is the case.

Figure 6:
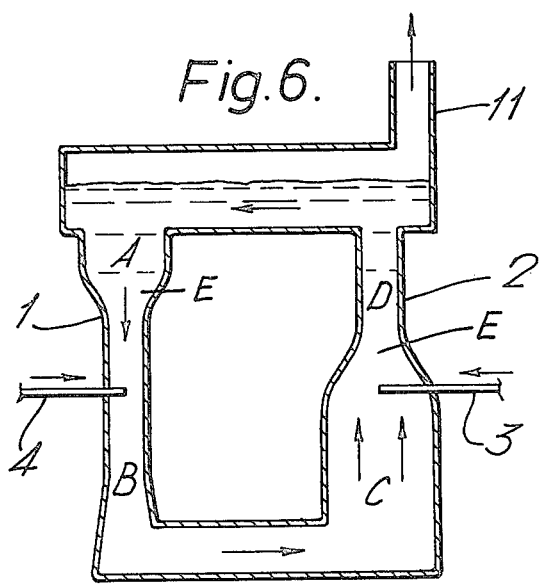

A side-by-side arrangement of the downcomer and riser (without using a partitioning wall) is also possible—as shown in FIG. 6—particularly if the system is constructed above ground as a pressure vessel (which is a strong possibility for certain industrial applications). In this embodiment, the system is likely to be closed at the top (since it is cheaper to make it in steel this way) and may have a spray trap, such as a cyclone (not illustrated), located in or before an exhaust stack 11. In this embodiment, it would be possible to dispense with the enlarged upper Section A of the downcomer 1 provided that the lower end of Section B of the downcomer 1 is of reduced diameter in comparison with Section C of the riser 2.

It is claimed:

1. A method for the biological degradation of a solids-liquid sewage mixture which comprises a step wherein the solids-liquid sewage mixture is circulated through a system comprising a downcomer and a riser communicating with each other at their upper and lower ends, the downcomer having an upper portion of enlarged cross-sectional area and a lower portion of reduced cross-sectional area and a connecting portion connecting the upper and lower downcomer portions, said connecting portion being of lesser length than the upper portion and the lower portion, said upper and lower portions having substantially constant cross-sections along their lengths, the riser having a lower portion of enlarged cross-sectional area and an upper portion of reduced cross-sectional area and a connecting portion connecting the upper and lower riser portions, said connecting portion being of lesser length than the upper riser portion and the lower riser portion, said upper and lower riser portions having substantially constant cross-sections along their lengths, the combined cross-sectional area of the upper portions of the downcomer and riser being substantially equal to the combined cross sectional area of the lower portions of the downcomer and riser, air being injected into the riser to start the solids-liquid sewage mixture circulating around the system and an oxygen-containing gas being injected into the sewage as it passes through the lower portion of reduced cross-section of the downcomer, the liquid velocity in the upper portion of the riser being not less than 1 meter/second and the liquid velocity in the lower portion of the downcomer being not less than 1.2 meters/second.

* * * * *